United States Patent
Lu et al.

(10) Patent No.: US 12,290,882 B2
(45) Date of Patent: May 6, 2025

(54) COPPER-PHOSPHORUS-ZINC-TIN BRAZING SHEET AND PREPARATION METHOD AND USE THEREOF

(71) Applicant: ZHENGZHOU RESEARCH INSTITUTE OF MECHANICAL ENGINEERING CO., LTD., Henan (CN)

(72) Inventors: Quanbin Lu, Henan (CN); Yinyin Pei, Henan (CN); Yafang Cheng, Henan (CN); Junlan Huang, Henan (CN); Xian Dong, Henan (CN); Yuanxun Shen, Henan (CN); Jia Ma, Henan (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 65 days.

(21) Appl. No.: 18/169,182

(22) Filed: Feb. 14, 2023

(65) Prior Publication Data
US 2024/0017359 A1    Jan. 18, 2024

(30) Foreign Application Priority Data
May 27, 2022    (CN) ......................... 202210592502.2

(51) Int. Cl.
| | |
|---|---|
| B23K 35/00 | (2006.01) |
| B23K 35/02 | (2006.01) |
| B23K 35/30 | (2006.01) |
| C22C 9/00 | (2006.01) |
| C22C 13/00 | (2006.01) |

(52) U.S. Cl.
CPC ........ *B23K 35/0238* (2013.01); *B23K 35/302* (2013.01); *C22C 9/00* (2013.01); *C22C 13/00* (2013.01)

(58) Field of Classification Search
CPC .... B23K 35/0222–0238; B23K 35/302; B23K 35/26; B23K 35/262; B23K 35/282; B23K 1/0012; B23K 2101/14; C22C 9/00; C22C 13/00; C22C 9/04; C23C 2/04; C23C 24/106; C23C 28/021
USPC ........ 228/56.3, 245–246, 183, 262.6–262.61
See application file for complete search history.

(56) References Cited

U.S. PATENT DOCUMENTS

| | | | | |
|---|---|---|---|---|
| 4,871,622 | A * | 10/1989 | Rabinkin | B23K 35/0238 228/56.3 |
| 2017/0266765 | A1* | 9/2017 | Zhang | B23K 35/262 |
| 2019/0366486 | A1* | 12/2019 | Zhang | H05K 3/3457 |

FOREIGN PATENT DOCUMENTS

| | | | | |
|---|---|---|---|---|
| CA | 3048225 A1 | * | 8/2018 | ........... B23K 1/0012 |
| CN | 104907728 A | * | 9/2015 | ......... B23K 35/0227 |
| CN | 106238947 A | * | 12/2016 | ......... B23K 35/0266 |
| CN | 104907721 B | * | 11/2017 | ......... B23K 35/0266 |

(Continued)

*Primary Examiner* — Kiley S Stoner
(74) *Attorney, Agent, or Firm* — Tarolli, Sundheim, Covell & Tummino LLP

(57) ABSTRACT

The present disclosure relates to a copper-phosphorus-zinc-tin brazing sheet and a preparation method and use thereof. The copper-phosphorus-zinc-tin brazing sheet includes a copper core layer, CuP alloy layers respectively arranged on two sides of the copper core layer, and at least two SnZn alloy layers respectively arranged on the other sides of the two CuP alloy layers away from the copper core layer.

18 Claims, 2 Drawing Sheets

(56) References Cited

FOREIGN PATENT DOCUMENTS

| | | | | |
|---|---|---|---|---|
| CN | 110603349 A | * | 12/2019 | ............. C22C 18/00 |
| CN | 111761255 A | * | 10/2020 | |
| CN | 112548306 A | * | 3/2021 | |
| CN | 114193019 A | * | 3/2022 | |
| CN | 114214552 A | * | 3/2022 | |
| CN | 114871625 A | * | 8/2022 | ......... B23K 35/0238 |
| CN | 114871634 A | * | 8/2022 | ......... B23K 35/0227 |
| CN | 114871635 A | * | 8/2022 | |
| CN | 114932336 A | * | 8/2022 | ......... B23K 35/0238 |
| CN | 115283880 A | * | 11/2022 | ......... B23K 35/0227 |
| EP | 3157046 B1 | * | 10/2022 | ............. B32B 15/00 |
| JP | 4349641 B1 | * | 10/2009 | ......... B23K 35/0261 |
| WO | WO-2017061443 A1 | * | 4/2017 | |

\* cited by examiner

COPPER-PHOSPHORUS-ZINC-TIN BRAZING SHEET AND PREPARATION METHOD AND USE THEREOF

CROSS-REFERENCE TO RELATED APPLICATIONS

The present disclosure claims the priority to the Chinese Patent Application No. 202210592502.2, entitled "Copper-phosphorus-zinc-tin Brazing Sheet and Preparation Method and Use thereof", and filed with the China Patent Office on May 27, 2022, the entire contents of which are incorporated herein by reference.

TECHNICAL FIELD

The present disclosure relates to the technical field of brazing materials, in particular to a copper-phosphorus-zinc-tin brazing sheet and a preparation method and use thereof.

BACKGROUND ART

Currently, the brazing materials used for brazing steel are mainly silver-based brazing materials, of which the silver content is generally more than 25% (such as the silver brazing material disclosed in Patent Document CN111344105A). The high-silver brazing materials, because of the recycling difficulty of the brazing material, have disadvantages of silver resource consumption and high cost. In order to reduce cost, it is necessary to develop low-silver brazing materials instead of high-silver brazing materials.

A copper-phosphorus brazing material, which is a widely used copper-based brazing material, has strength and heat resistance that are not less than commonly used silver brazing material. However, during the brazing process, the P element in the copper-phosphorus brazing material would react with the Fe element in the steel base material to form a brittle compound layer at an interface, resulting in greater brittleness of the brazing joint, which limits popularization and application of the copper-phosphorus brazing materials.

In the prior art, a novel copper-phosphorus brazing material whose surface is plated and coated with a low-melting silver alloy layer or a pure tin layer is reported. When this brazing material is used to braze steel joints, the thickness of the compound layer at an interface is still relatively large, and the toughness of the joint is not adequately improved. This is because the plated and coated silver alloy also has a high melting point, and cannot quickly wet the steel and block the interfacial reaction between P and steel. Although the plated and coated pure tin has a low melting point, the liquid tin, because of its high viscosity and low fluidity, still cannot effectively block the interfacial reaction between P and steel.

In addition, due to the brittleness of copper-phosphorus brazing materials, it is difficult to obtain thin copper-phosphorus brazing sheets by the existing preparation methods. The relatively thin copper-phosphorus brazing sheet is a brazing material used in a large amount in the electric power and motor manufacturing industries.

In view of this, the present disclosure is proposed.

SUMMARY

It is a first object of the present disclosure to provide a copper-phosphorus-zinc-tin brazing sheet in which a Sn91Zn layer provided at an outermost layer can block diffusion of the P element in an inner layer and suppress formation of brittle phase at an interface, thereby improving strength and toughness of a joint.

It is a second object of the present disclosure to provide a preparation method of the copper-phosphorus-zinc-tin brazing sheet, in which waste heat from CuP alloying is used to alloy low-melting-point SnZn alloy powder on a surface of CuP. The method not only saves energy, but also improves efficiency.

It is a third object of the present disclosure to provide a use of the copper-phosphorus-zinc-tin brazing sheet.

In order to achieve the above-mentioned objects of the present disclosure, the following technical solutions are adopted.

The present disclosure provides a copper-phosphorus-zinc-tin brazing sheet including a copper core layer, CuP alloy layers respectively arranged on two sides of the copper core layer, and at least two SnZn alloy layers arranged on respective sides of the two CuP alloy layers away from the copper core layer. That is, at least one SnZn alloy layer is provided on the side of each CuP alloy layer away from the copper core layer.

The copper-phosphorus-zinc-tin brazing sheet includes at least 5 layers. The copper core layer is made of a material of elemental copper. In some specific embodiments of the present disclosure, the copper core layer is made of a material of red copper. The CuP alloy layer is made of a material of CuP alloy. The SnZn alloy layer is made of a material of SnZn alloy.

In some specific embodiments of the present disclosure, as shown in FIG. 1, the copper-phosphorus-zinc-tin brazing sheet includes 5 layers. The copper core layer is arranged, as an intermediate layer, between the two CuP alloy layers. That is, the two CuP alloy layers are respectively provided on two outer surfaces (an upper surface and a lower surface) of the copper core layer. Also, the SnZn alloy layers are respectively provided on surfaces of the two CuP alloy layers on the other side.

In other words, the copper-phosphorus-zinc-tin brazing sheet includes five layers consisting of 5 layers, i.e., the SnZn alloy layer, the CuP alloy layer, the copper core layer, the CuP alloy layer, and the SnZn alloy layer sequentially from top to bottom.

In the copper-phosphorus-zinc-tin brazing sheet provided by the present disclosure, the SnZn alloy in the outermost layer can block diffusion of P element in the inner layer and suppress formation of brittle phases at the interface, thereby improving strength and toughness of the joint.

Moreover, in the present disclosure, making use of the plasticity of copper, P, which is likely to cause brittle phases, is alloyed on the surface of copper in a form of a CuP alloy, which solves the problem of difficulty in obtaining thin brazing sheets due to the large amount of brittle phases of $Cu_3P$ in the traditional preparation process.

Preferably, the CuP alloy includes at least one of Cu8P alloy, Cu9P alloy, Cu10P alloy, Cu11P alloy, and Cu12P alloy.

In the above, the Cu8P alloy has a chemical composition of 92% Cu and 8% P in mass percentage.

The Cu9P alloy has a chemical composition of 91% Cu and 9% P in mass percentage.

The Cu10P alloy has a chemical composition of 90% Cu and 10% P in mass percentage.

The Cu11P alloy has a chemical composition of 89% Cu and 11% P in mass percentage.

The Cu12P alloy has a chemical composition of 88% Cu and 12% P in mass percentage.

Preferably, the SnZn alloy includes at least one of Sn90Zn alloy, Sn91Zn alloy, and Sn92Zn alloy.

In the above, the Sn90Zn alloy has a chemical composition of 90% Sn and 10% Zn in mass percentage.

The Sn91Zn alloy has a chemical composition of 91% Sn and 9% Zn in mass percentage.

The Sn92Zn alloy has a chemical composition of 92% Sn and 8% Zn in mass percentage.

Sn91Zn alloy can block diffusion of P element in the inner layer and suppress formation of brittle phases at the interface, thereby improving strength and toughness of the joint.

Preferably, a mass ratio of Cu, P, and the SnZn alloy in the copper-phosphorus-zinc-tin brazing sheet is 75-90:3-10:1-8 and preferably 80-89:5-9:2-6.

Namely, a ratio of a mass of Cu in the copper-phosphorus-zinc-tin brazing sheet, a mass of P in the copper-phosphorus-zinc-tin brazing sheet, and a mass of the SnZn alloy in the copper-phosphorus-zinc-tin brazing sheet is 75-90 (including, but not limited to, any point value or a range value between any two of 76, 77, 78, 79, 80, 82, 84, 85, 87, and 89):3-10 (including, but not limited to, any point value or a range value between any two of 4, 5, 6, 7, 8, and 9):1-8 (including, but not limited to, any point value or a range value between any two of 2, 3, 4, 5, and 6).

In the above, the mass of Cu refers to the mass of all of Cu element in the copper-phosphorus-zinc-tin brazing sheet, that is, the mass sum of the Cu element in the copper core layer and the Cu element in the two CuP alloy layers.

Likewise, the mass of P refers to the mass of all of P element in the copper-phosphorus-zinc-tin brazing sheet, including the P element in each CuP alloy layer.

Preferably, the copper-phosphorus-zinc-tin brazing sheet has a thickness of 0.1-3 mm, including, but not limited to, any point value or a range value between any two of 0.3 mm, 0.45 mm, 0.5 mm, 0.7 mm, 0.9 mm, 0.95 mm, 1 mm, 1.3 mm, 1.5 mm, 1.8 mm, 2 mm, 2.2 mm, 2.5 mm, 2.7 mm, and 2.9 mm; more preferably 0.4-2 mm, and even more preferably 0.45-1 mm.

The copper-phosphorus-zinc-tin brazing sheet provided by the present disclosure is relatively thin, which solves the problem in the prior art that a thin brazing sheet cannot be obtained due to the brittle phases of $Cu_3P$ in the preparation process of the copper-phosphorus brazing material.

Preferably, the copper core layer has a thickness of 0.1-0.3 mm; including, but not limited to, any point value or a range value between any two of 0.13 mm, 0.15 mm, 0.18 mm, 0.20 mm, 0.22 mm, 0.24 mm, 0.25 mm, 0.27 mm, and 0.29 mm.

Preferably, each of the CuP alloy layers has a thickness of 0.18-0.3 mm, including, but not limited to, any point value or a range value between any two of 0.19 mm, 0.20 mm, 0.21 mm, 0.22 mm, 0.23 mm, 0.24 mm, 0.25 mm, 0.26 mm, 0.27 mm, 0.28 mm, and 0.29 mm.

Preferably, each of the SnZn alloy layers has a thickness of 0.015-0.025 mm, including, but not limited to, any point value or a range value between any two of 0.016 mm, 0.017 mm, 0.018 mm, 0.019 mm, 0.02 mm, 0.021 mm, 0.022 mm, 0.023 mm, and 0.024 mm.

The present disclosure also provides a preparation method of the copper-phosphorus-zinc-tin brazing sheet described above, including following steps of:

making a copper core sequentially pass through a melted CuP alloy liquid and a solid SnZn alloy powder to obtain the copper-phosphorus-zinc-tin brazing sheet. That is, the copper core is made to be first pass through (immersed in) the melted CuP alloy liquid (in liquid state) at a certain speed, and then pass through (penetrate through) the solid SnZn alloy powder at a certain speed.

In the present disclosure, the copper core is made to pass through the melted CuP alloy liquid to form a Cu—P alloy layer owing to the plasticity of the copper core, then pass through the solid SnZn alloy powder to alloy the SnZn alloy powder at the exterior of the CuP alloy layer using the waste heat from the previous reaction (that is, the waste heat resulting from CuP alloying), and a relatively thin copper-phosphorus-zinc-tin brazing sheet can be obtained.

In this preparation method, by making use of the plasticity of copper core (in some specific embodiments of the present disclosure, red copper foil can be selected), P, which is likely to cause brittle phases, is alloyed on the surface of the copper core in a form of a CuP alloy (Cu10P alloy in some specific embodiments of the present disclosure), which overcomes the technical limitation of difficulty in obtaining relatively thin brazing sheets due to the large amount of brittle phases of $Cu_3P$ in the traditional preparation process.

Moreover, this preparation method uses the waste heat from CuP alloying to alloy SnZn (Sn91Zn in some specific embodiments of the present disclosure) low-melting-point eutectic powder at the outer layer of the brazing sheet, which can effectively block diffusion of P in the core layer and suppress formation of brittle phases at the interface of steel brazing joints, thereby improving toughness of the joints. The reason for this is as follows. The SnZn alloy layer has a low melting point (the melting point of the Sn91Zn alloy is only 199° C.), and Zn reduces the viscosity of the liquid Sn, and therefore the SnZn alloy has better fluidity and can quickly wet the steel surface and spread thereon. Zn also reacts with P, further hindering the diffusion of P toward the steel interface, thus effectively inhibiting the formation of brittle layers at the interface.

In addition, the waste heat from CuP alloying is used to alloy the low-melting-point alloy powder SnZn on the surface of CuP, which not only saves energy, but also improves efficiency.

In the above, the method of passing includes at least one of soaking, immersing, submersing, passing through (going into), feeding into, penetrating through, and covering (including partially covering or fully covering).

In some specific embodiments of the present disclosure, before the copper core is made to sequentially pass through the melted CuP alloy liquid and the solid SnZn alloy powder, a copper core (preferably red copper foil) is taken, and the required masses and thicknesses of the CuP alloy and SnZn alloy are respectively calculated according to the mass ratio (or the mass fraction of each element) and densities of individual elements. In the above, since the mass and thickness of the copper core used are known (obtainable), the thickness of the CuP alloy depends on the mass of the CuP alloy, and the thickness of the SnZn alloy depends on the mass of the SnZn alloy.

Preferably, the temperature of the melted CuP alloy liquid is 800-850° C., including, but not limited to, any point value or a range value between any two of 805° C., 810° C., 815° C., 820° C., 825° C., 830° C., 835° C., 840° C., and 845° C.

In the above, the temperature of the melted CuP alloy liquid would affect the thickness of the CuP alloy layer of the prepared copper-phosphorus-zinc-tin brazing sheet.

Preferably, the solid SnZn alloy powder has a particle size of 120-200 meshes, including, but not limited to, any point value or a range value between any two of 130 meshes, 140 meshes, 150 meshes, 160 meshes, 170 meshes, 180 meshes, and 190 meshes.

Preferably, the passing speed is 20-30 mm/s, including, but not limited to, any point value or a range value between any two of 21 mm/s, 22 mm/s, 23 mm/s, 24 mm/s, 25 mm/s, 26 mm/s, 27 mm/s, 28 mm/s, and 29 mm/s; and more preferably 22-28 mm/s. The passing speed mentioned here includes both the speed at which the copper core passes through the melted CuP alloy liquid and the speed at which the copper core passes through the solid SnZn alloy powder. In the above, the speed at which the copper core passes through the melted CuP alloy liquid and the speed at which the copper core passes through the solid SnZn alloy powder may be the same or different.

That is, the speed at which the copper core passes through the melted CuP alloy liquid is 20-30 mm/s, and/or the speed at which the copper core passes through the solid SnZn alloy powder is 20-30 mm/s.

In the above, the speed at which the copper core passes through the melted CuP alloy liquid would affect the thickness of the CuP alloy layer of the prepared copper-phosphorus-zinc-tin brazing sheet. The speed at which the copper core passes through the solid SnZn alloy powder would affect the thickness of the SnZn alloy layer of the prepared copper-phosphorus-zinc-tin brazing sheet.

In some specific embodiments of the present disclosure, during the process of making the copper core pass through the solid SnZn alloy powder, the entire surface of the copper core is covered by the solid SnZn alloy powder.

In some specific embodiments of the present disclosure, the copper core is a polished copper core (i.e., the copper core subjected to the polishing treatment). Preferably, the copper core is sheet-shaped. Preferably, the copper core is red copper foil. Specifically, sandpaper may be used for the polishing treatment. Preferably, a step of wiping the polished copper core clean with an ethanol solution is further included after the polishing treatment.

In some specific embodiments of the present disclosure, after the polishing treatment, a step of winding is further included.

Preferably, the spreading length of the solid SnZn alloy powder is 150-300 mm, including, but not limited to, any point value or a range value between any two of 160 mm, 170 mm, 180 mm, 190 mm, 200 mm, 210 mm, 220 mm, 230 mm, 240 mm, 250 mm, 260 mm, 270 mm, 280 mm, and 290 mm; and more preferably 180-260 mm.

In the above, the spreading length of the solid SnZn alloy powder would affect the thickness of the SnZn alloy layer of the prepared copper-phosphorus-zinc-tin brazing sheet.

In some specific embodiments of the present disclosure, the solid SnZn alloy powder is placed in a barrel of a certain length, wherein the length of the barrel is 150-300 mm, including, but not limited to, any point value or a range value between any two of 160 mm, 170 mm, 180 mm, 190 mm, 200 mm, 210 mm, 220 mm, 230 mm, 240 mm, 250 mm, 260 mm, 270 mm, 280 mm, and 290 mm. When the solid SnZn alloy powder at least covers at least one inner surface of the barrel, or when the solid SnZn alloy powder completely fills the barrel, the length of the barrel would affect the thickness of the SnZn alloy layer of the prepared copper-phosphorus-zinc-tin brazing sheet.

The present disclosure also provides a use of the copper-phosphorus-zinc-tin brazing sheet described above, or a copper-phosphorus-zinc-tin brazing sheet prepared by the preparation method of the copper-phosphorus-zinc-tin brazing sheet described above in welding steel and nickel-based alloys.

Preferably, the welding is brazing.

Preferably, the steel includes low carbon steel and/or alloy steel.

In some specific embodiments of the present disclosure, the copper-phosphorus-zinc-tin brazing sheet obtained in the present disclosure is used for brazing steel and/or nickel-based alloys.

The present disclosure has the following advantageous effects as compared to the prior art.

(1) The copper-phosphorus-zinc-tin brazing sheet provided by the present disclosure can block the diffusion of P element in the inner layer by the Sn91Zn layer provided at the outermost layer, and suppress the formation of brittle phases at the interface, thereby improving the strength and toughness of the joint.

(2) The copper-phosphorus-zinc-tin brazing sheet provided by the present disclosure is relatively thin, which solves the problem in the prior art that a relatively thin brazing sheet can hardly be obtained due to the large amount of brittle phases of $Cu_3P$.

(3) The preparation method of the copper-phosphorus-zinc-tin brazing sheet provided by the present disclosure uses the waste heat from CuP alloying to alloy SnZn low-melting-point eutectic powder on the outer layer of the brazing sheet, which can effectively block diffusion of P in the core layer and suppress formation of brittle phases at the interface of brazing joints of steel, thereby improving toughness of the joint.

(4) The preparation method of the copper-phosphorus-zinc-tin brazing sheet provided by the present disclosure uses the waste heat from CuP alloying to alloy the low-melting-point alloy powder SnZn on the surface of CuP, which not only saves energy, but also improves efficiency.

BRIEF DESCRIPTION OF DRAWINGS

In order to clarify the technical solutions of the specific embodiments of the present disclosure or the technical solutions in the prior art, the drawings used in the description of the specific embodiments and the prior art will be briefly introduced below. It is apparent that the drawings in the following description only show some embodiments of the present disclosure, and those of ordinary skill in the art can obtain other drawings based on these drawings without any creative work.

DETAILED DESCRIPTION OF THE EMBODIMENTS

The technical solutions of the present disclosure will be clearly and completely described below with reference to the drawings and specific embodiments. However, those skilled in the art should understand that the examples described below are some, but not all, of the examples of the present disclosure, and are merely used to illustrate the present disclosure but should not be construed as a limitation of the scope of the present disclosure. Based on the examples of the present disclosure, all other examples obtained by those of ordinary skill in the art without any creative effort belong to the protection scope of the present disclosure. The examples for which the specific conditions are not indicated are carried out according to the conventional conditions or the conditions suggested by the manufacturers. The used reagents or instruments for which the manufacturers are not indicated are all conventional products that can be purchased from the market.

Example 1

Figure 1:
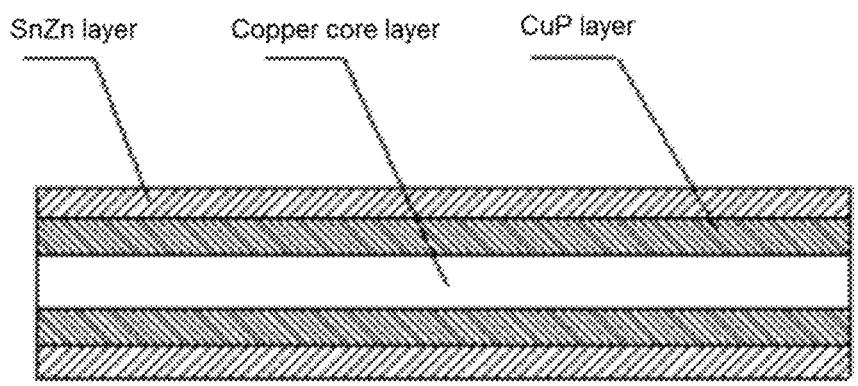
FIG. 1 is a schematic diagram of a layer structure of the copper-phosphorus-zinc-tin brazing sheet provided by the present disclosure.
Figure 2:
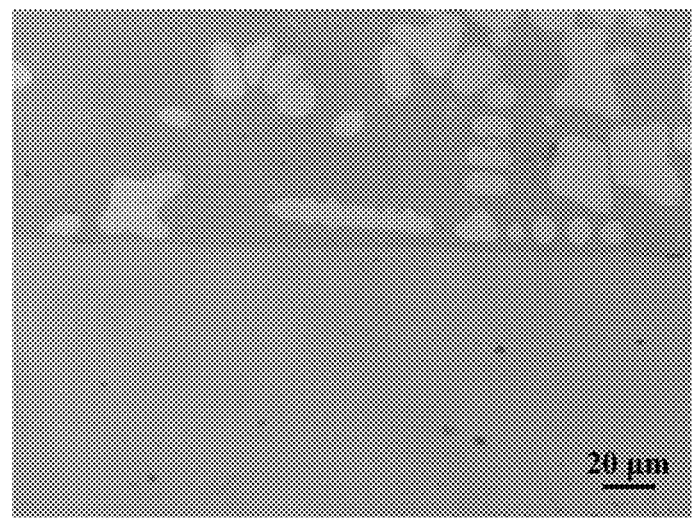
FIG. 2 is a metallographic micrograph of the brazing joint in Example 3 provided by the present disclosure.
Figure 3:
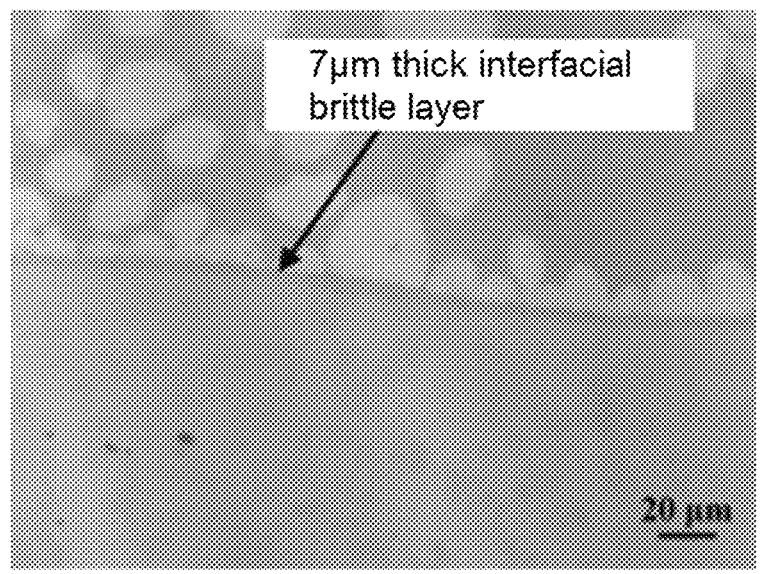
FIG. 3 is a metallographic micrograph of the brazing joint in Comparative Example 4 provided by the present disclosure.
Figure 4:
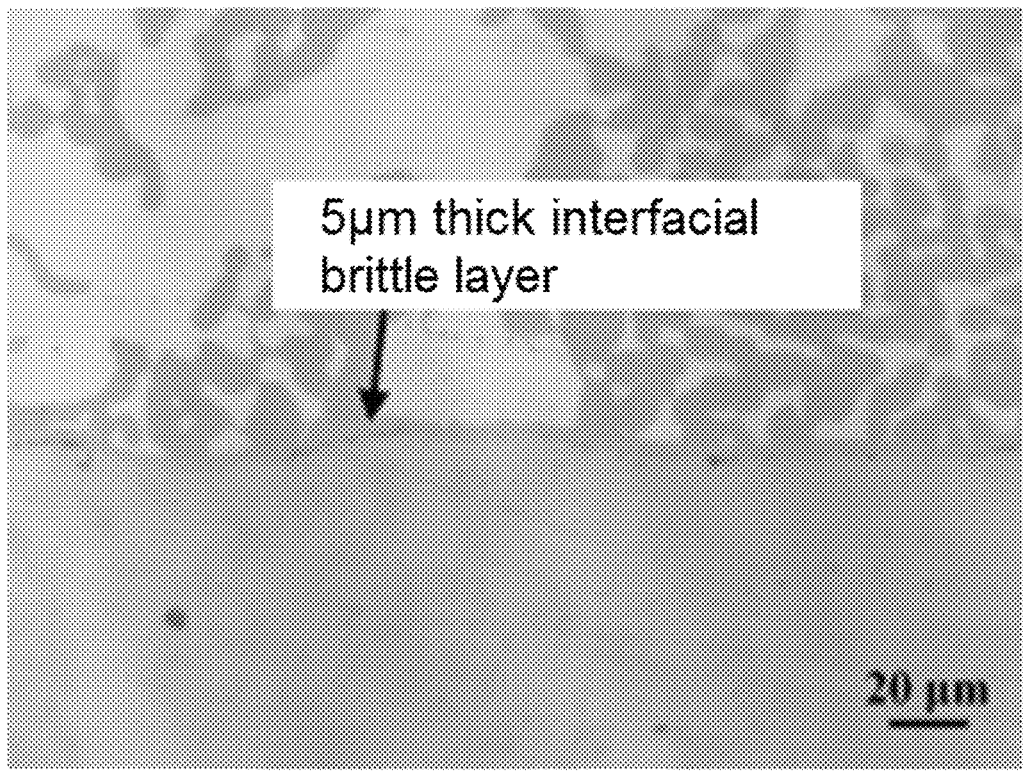
FIG. 4 is a metallographic micrograph of the brazing joint in Comparative Example 5 provided by the present disclosure.
Figure 5:
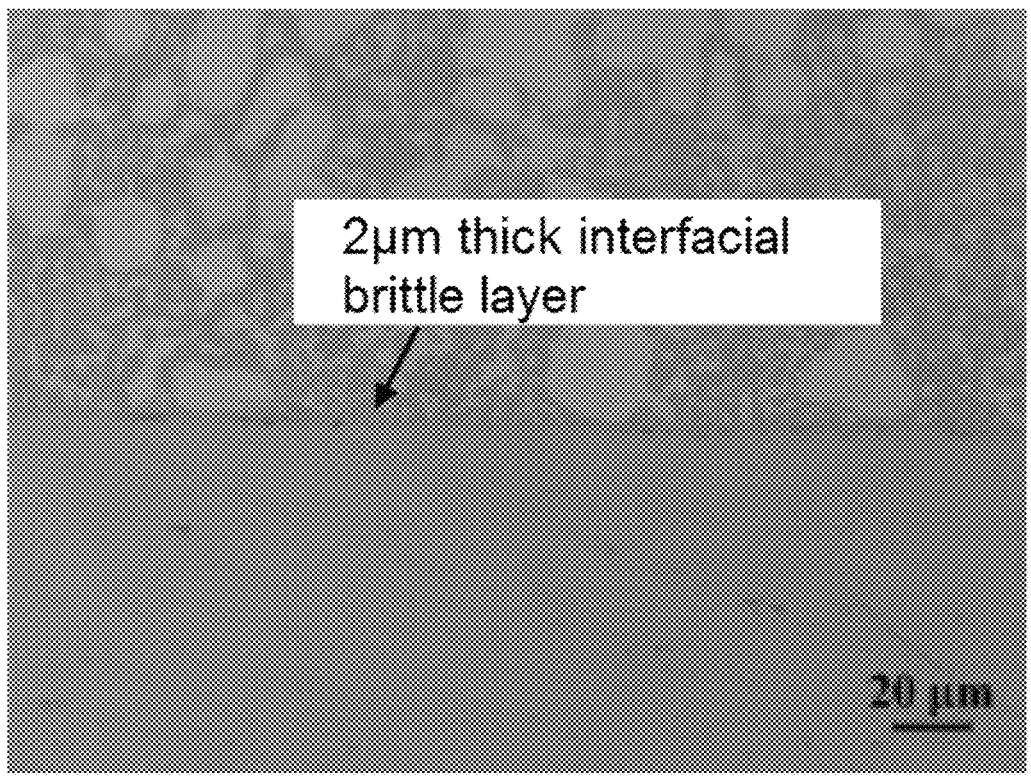
FIG. 5 is a metallographic micrograph of the brazing joint in Comparative Example 6 provided by the present disclosure.

The copper-phosphorus-zinc-tin brazing sheet provided in this example had a five-layer structure, specifically including a copper core layer, Cu10P alloy layers respectively arranged on two sides of the copper core layer, and two Sn91Zn alloy layers respectively arranged on the other sides of the two Cu10P alloy layers. A schematic diagram of its layer structure is shown in FIG. 1.

The mass ratio of Cu, P, and Sn91Zn alloy in the copper-phosphorus-zinc-tin brazing sheet was 80:5:2.

The preparation method of the copper-phosphorus-zinc-tin brazing sheet provided in this example included the following steps.

(1) A red copper foil (namely, copper core) with a mass of 10,000 g was weighed, and the required masses and thicknesses of the Cu10P alloy and Sn91Zn alloy were respectively calculated according to the mass ratio and densities (the Cu10P density is 86 g/cm$^3$, the Cu density is 8.96 g/cm$^3$, and the Sn91Zn density is 6 g/cm$^3$) of individual elements.

(2) A Cu10P alloy block was weighed and placed in a graphite crucible, and heated to a temperature of 850° C. to obtain a melted Cu10P alloy liquid.

(3) A Sn91Zn alloy powder with a particle size of 120-200 meshes was weighed and placed in a barrel with a length of 150 mm, and the Sn91Zn alloy powder was fully filled in the barrel along the length direction thereof to reach a thickness at which the red copper foil passing through the barrel is completely covered (namely, the spreading length of the solid Sn91Zn alloy powder was made to be 150 mm).

(4) The red copper foil in step (1) was polished with sandpaper and wiped clean with alcohol, and the red copper foil was made to pass through the melted Cu10P alloy liquid and solid Sn91Zn alloy powder sequentially at a speed of 30 mm/s and then wound to obtain the copper-phosphorus-zinc-tin brazing sheet.

In the above, the red copper foil had a thickness of 0.3 mm, each Cu10P alloy layer had a thickness of 0.25 mm, each Sn91Zn alloy layer had a thickness of 0.025 mm, and the copper-phosphorus-zinc-tin brazing sheet had a thickness (namely, the total thickness of the brazing sheet) of 0.85 mm.

Example 2

The copper-phosphorus-zinc-tin brazing sheet provided in this example had a five-layer structure, specifically including a copper core layer, Cu10P alloy layers respectively arranged on two sides of the copper core layer, and two Sn91Zn alloy layers respectively arranged on the other sides of the two Cu10P alloy layers.

The mass ratio of Cu, P, and Sn91Zn alloy in the copper-phosphorus-zinc-tin brazing sheet was 82:6:3.

The preparation method of the copper-phosphorus-zinc-tin brazing sheet provided in this example included the following steps.

(1) A red copper foil (namely, copper core) with a mass of 10,000 g was weighed, and the required masses and thicknesses of the Cu10P alloy and Sn91Zn alloy were respectively calculated according to the mass ratio and densities (the Cu10P density is 86 g/cm$^3$, the Cu density is 8.96 g/cm$^3$, and the Sn91Zn density is 6 g/cm$^3$) of individual elements.

(2) A Cu10P alloy block was weighed and placed in a graphite crucible, and heated to a temperature of 840° C. to obtain a melted Cu10P alloy liquid.

(3) A Sn91Zn alloy powder with a particle size of 120-200 meshes was weighed and placed in a barrel with a length of 180 mm, and the Sn91Zn alloy powder was fully filled in the barrel along the length direction thereof to reach a thickness at which the red copper foil inside the barrel is completely covered (namely, the spreading length of the solid Sn91Zn alloy powder was made to be 180 mm).

(4) The red copper foil in step (1) was polished with sandpaper and wiped clean with alcohol, and the red copper foil was made to pass through the melted Cu10P alloy liquid and solid Sn91Zn alloy powder sequentially at a speed of 28 mm/s and then wound to obtain a copper-phosphorus-zinc-tin brazing sheet.

In the above, the red copper foil had a thickness of 0.3 mm, each Cu10P alloy layer had a thickness of 0.3 mm, each Sn91Zn alloy layer had a thickness of 0.015 mm, and the copper-phosphorus-zinc-tin brazing sheet had a thickness (namely, the total thickness of the brazing sheet) of 0.93 mm.

Example 3

The copper-phosphorus-zinc-tin brazing sheet provided in this example had a five-layer structure, specifically including a copper core layer, Cu10P alloy layers respectively arranged on two sides of the copper core layer, and two Sn91Zn alloy layers respectively arranged on the other sides of the two Cu10P alloy layers.

The mass ratio of Cu, P, and Sn91Zn alloy in the copper-phosphorus-zinc-tin brazing sheet was 85:7:4.

The preparation method of the copper-phosphorus-zinc-tin brazing sheet provided in this example included the following steps.

(1) A red copper foil (namely, copper core) with a mass of 10,000 g was weighed, and the required masses and thicknesses of the Cu10P alloy and Sn91Zn alloy were respectively calculated according to the mass ratio and densities (the Cu10P density is 86 g/cm$^3$, the Cu density is 8.96 g/cm$^3$, and the Sn91Zn density is 6 g/cm$^3$) of individual elements.

(2) A Cu10P alloy block was weighed and placed in a graphite crucible, and heated to a temperature of 830° C. to obtain a melted Cu10P alloy liquid.

(3) A Sn91Zn alloy powder with a particle size of 120-200 meshes was weighed and placed in a barrel with a length of 220 mm, and the Sn91Zn alloy powder was fully filled in the barrel along the length direction thereof to completely cover the red copper foil inside the barrel (namely, the spreading length of the solid Sn91Zn alloy powder was made to be 220 mm).

(4) The red copper foil in step (1) was polished with sandpaper and wiped clean with alcohol, and the red copper foil was made to pass through the melted Cu10P alloy liquid and solid Sn91Zn alloy powder sequentially at a speed of 24 mm/s and then wound to obtain a copper-phosphorus-zinc-tin brazing sheet.

In the above, the red copper foil had a thickness of 0.1 mm, each Cu10P alloy layer had a thickness of 0.18 mm, each Sn91Zn alloy layer had a thickness of 0.015 mm, and the copper-phosphorus-zinc-tin brazing sheet had a thickness (namely, the total thickness of the brazing sheet) of 0.49 mm.

Example 4

The copper-phosphorus-zinc-tin brazing sheet provided in this example had a five-layer structure, specifically including a copper core layer, Cu10P alloy layers respectively arranged on two sides of the copper core layer, and two Sn91Zn alloy layers respectively arranged on the other sides of the two Cu10P alloy layers.

The mass ratio of Cu, P, and Sn91Zn alloy in the copper-phosphorus-zinc-tin brazing sheet was 88:8:5.

The preparation method of the copper-phosphorus-zinc-tin brazing sheet provided in this example included the following steps.
(1) A red copper foil (namely, copper core) with a mass of 5,000 g was weighed, and the required masses and thicknesses of the Cu10P alloy and Sn91Zn alloy were respectively calculated according to the mass ratio and densities of individual elements.
(2) A Cu10P alloy block was weighed and placed in a graphite crucible, and heated to a temperature of 820° C. to obtain a melted Cu10P alloy liquid.
(3) A Sn91Zn alloy powder with a particle size of 120-200 meshes was weighed and placed in a barrel with a length of 260 mm, and the Sn91Zn alloy powder was fully filled in the barrel along the length direction thereof to completely cover the red copper foil inside the barrel (namely, the spreading length of the solid Sn91Zn alloy powder was made to be 260 mm).
(4) The red copper foil in step (1) was polished with sandpaper and wiped clean with alcohol, and the red copper foil was made to pass through the melted Cu10P alloy liquid and solid Sn91Zn alloy powder sequentially at a speed of 22 mm/s and then wound to obtain a copper-phosphorus-zinc-tin brazing sheet.

In the above, the red copper foil had a thickness of 0.1 mm, each Cu10P alloy layer had a thickness of 0.18 mm, each Sn91Zn alloy layer had a thickness of 0.02 mm, and the copper-phosphorus-zinc-tin brazing sheet had a thickness (namely, the total thickness of the brazing sheet) of 0.5 mm.

Example 5

The copper-phosphorus-zinc-tin brazing sheet provided in this example had a five-layer structure, specifically including a copper core layer, Cu10P alloy layers respectively arranged on two sides of the copper core layer, and two Sn91Zn alloy layers respectively arranged on the other sides of the two Cu10P alloy layers.

The mass ratio of Cu, P, and Sn91Zn alloy in the copper-phosphorus-zinc-tin brazing sheet was 89:9:6.

The preparation method of the copper-phosphorus-zinc-tin brazing sheet provided in this example included the following steps.
(1) A red copper foil (namely, copper core) with a mass of 8,000 g was weighed, and the required masses and thicknesses of the Cu10P alloy and Sn91Zn alloy were respectively calculated according to the mass ratio and densities of individual elements.
(2) A Cu10P alloy block was weighed and placed in a graphite crucible, and heated to a temperature of 800° C. to obtain a melted Cu10P alloy liquid.
(3) A Sn91Zn alloy powder with a particle size of 120-200 meshes was weighed and placed in a barrel with a length of 300 mm, and the Sn91Zn alloy powder was fully filled in the barrel along the length direction thereof to completely cover the red copper foil inside the barrel (namely, the spreading length of the solid Sn91Zn alloy powder was made to be 300 mm).
(4) The red copper foil in step (1) was polished with sandpaper and wiped clean with alcohol, and the red copper foil was made to pass through the melted Cu10P alloy liquid and solid Sn91Zn alloy powder sequentially at a speed of 20 mm/s and then wound to obtain a copper-phosphorus-zinc-tin brazing sheet.

In the above, the red copper foil had a thickness of 0.2 mm, each Cu10P alloy layer had a thickness of 0.25 mm, each Sn91Zn alloy layer had a thickness of 0.015 mm, and the copper-phosphorus-zinc-tin brazing sheet had a thickness (namely, the total thickness of the brazing sheet) of 0.73 mm.

Example 6

The copper-phosphorus-zinc-tin brazing sheet provided in this example had a five-layer structure, specifically including a copper core layer, Cu8P alloy layers respectively arranged on two sides of the copper core layer, and two Sn90Zn alloy layers respectively arranged on the other sides of the two Cu8P alloy layers.

The mass ratio of Cu, P, and Sn90Zn alloy in the copper-phosphorus-zinc-tin brazing sheet was 85:7:4.

The preparation method of the copper-phosphorus-zinc-tin brazing sheet provided in this example was basically the same as that of Example 3, except that the Cu10P alloy is replaced by the Cu8P alloy, and the Sn91Zn alloy is replaced by the Sn90Zn alloy. In the above, the density of Cu is 8.96 g/cm$^3$, the density of the Cu8P alloy is 7.45 g/cm$^3$, and the density of the Sn91Zn alloy is 5.85 g/cm$^3$. In the copper-phosphorus-zinc-tin brazing sheet, the red copper foil had a thickness of 0.1 mm, each Cu8P alloy layer had a thickness of 0.15 mm, and each Sn90Zn alloy layer had a thickness of 0.006 mm. The total thickness of the copper-phosphorus-zinc-tin brazing sheet was 0.412 mm.

Example 7

The copper-phosphorus-zinc-tin brazing sheet provided in this example had a five-layer structure, specifically including a copper core layer, Cu12P alloy layers respectively arranged on two sides of the copper core layer, and two Sn92Zn alloy layers respectively arranged on the other sides of the two Cu12P alloy layers.

The mass ratio of Cu, P, and Sn92Zn alloy in the copper-phosphorus-zinc-tin brazing sheet was 85:7:4.

The preparation method of the copper-phosphorus-zinc-tin brazing sheet provided in this example was basically the same as that of Example 3, except that the Cu10P alloy is replaced by the Cu12P alloy, and the Sn91Zn alloy is replaced by the Sn92Zn alloy. In the above, the density of Cu is 8.96 g/cm$^3$, the density of the Cu12P alloy is 6.9 g/cm$^3$, and the density of the Sn92Zn alloy is 5.84 g/cm$^3$. In the copper-phosphorus-zinc-tin brazing sheet, the red copper foil had a thickness of 0.1 mm, each Cu12P alloy layer had a thickness of 0.1 mm, and each Sn92Zn alloy layer had a thickness of 0.005 mm. The total thickness of the copper-phosphorus-zinc-tin brazing sheet was 0.31 mm.

Comparative Example 1

The mass ratio of Cu and P in the brazing sheet provided in this comparative example was 85:7 (the brazing sheet did not contain the Sn91Zn alloy).

The preparation method of the brazing sheet provided in this comparative example included the following steps.
(1) A red copper foil (namely, copper core) with a mass of 5,000 g was weighed, and the required mass and thickness of the Cu10P alloy were calculated according to the mass ratio and densities of individual elements.
(2) A Cu10P alloy block was weighed and placed in a graphite crucible, and heated to a temperature of 830° C. to obtain a melted Cu10P alloy liquid.
(3) The red copper foil in step (1) was polished with sandpaper and wiped clean with alcohol, and the red copper foil was made to pass through the melted Cu10P alloy liquid at a speed of 24 mm/s and then wound to obtain a brazing sheet.

In the above, the red copper foil had a thickness of 0.2 mm, each Cu10P alloy layer had a thickness of 0.35 mm, and the brazing sheet had a thickness (namely, the total thickness of the brazing sheet) of 0.9 mm.

Comparative Example 2

The mass ratio of Cu and P in the brazing sheet provided in this comparative example was 110:11 (the brazing sheet did not contain the Sn91Zn alloy).

The preparation method of the brazing sheet provided in this comparative example included the following steps.
(1) A red copper foil (namely, copper core) with a mass of 5,000 g was weighed, and the required mass and thickness of the Cu10P alloy were calculated according to the mass ratio and densities of individual elements.
(2) A Cu10P alloy block was weighed and placed in a graphite crucible, and heated to a temperature of 830° C. to obtain a melted Cu10P alloy liquid.
(3) The red copper foil in step (1) was polished with sandpaper and wiped clean with alcohol, and the red copper foil was made to pass through the melted Cu10P alloy liquid at a speed of 24 mm/s and then wound to obtain a brazing sheet.

In the above, the red copper foil had a thickness of 0.2 mm, each Cu10P alloy layer had a thickness of 1.1 mm, and the brazing sheet had a thickness (namely, the total thickness of the brazing sheet) of 2.4 mm.

Comparative Example 3

The brazing sheet provided in this comparative example had a five-layer structure, specifically including a copper core layer, Cu10P alloy layers respectively arranged on two sides of the copper core layer, and two Sn91Zn alloy layers respectively arranged on the other sides of the two Cu10P alloy layers The mass ratio of Cu, P, and Sn91Zn alloy in the brazing sheet was 85:7:15.

The preparation method of the brazing sheet provided in this comparative example included the following steps.
(1) A red copper foil (namely, copper core) with a mass of 5,000 g was weighed, and the required masses and thicknesses of the Cu10P alloy and Sn91Zn alloy were respectively calculated according to the mass ratio and densities of individual elements.
(2) A Cu10P alloy block was weighed and placed in a graphite crucible, and heated to a temperature of 830° C. to obtain a melted Cu10P alloy liquid.
(3) A Sn91Zn alloy powder with a particle size of 120-200 meshes was weighed and placed in a barrel with a length of 300 mm, and the Sn91Zn alloy powder was fully filled in the barrel along the length direction thereof to reach a thickness at which the red copper foil passing through the barrel could be completely covered (namely, the spreading length of the solid Sn91Zn alloy powder was made to be 300 mm).
(4) The red copper foil in step (1) was polished with sandpaper and wiped clean with alcohol, and the red copper foil was made to pass through the melted Cu10P alloy liquid and solid Sn91Zn alloy powder sequentially at a speed of 24 mm/s and then wound to obtain a brazing sheet.

In the above, the red copper foil had a thickness of 0.2 mm, each Cu10P alloy layer had a thickness of 0.1 mm, each Sn91Zn alloy layer had a thickness of 0.025 mm, and the brazing sheet had a thickness (namely, the total thickness of the brazing sheet) of 0.45 mm.

Comparative Example 4

This comparative example provided a L209 copper-phosphorus brazing material manufactured by Hangzhou Huaguang Advanced Welding Materials Co., Ltd.

Comparative Example 5

This comparative example provided a L209 low-melting-point silver alloy plated brazing material manufactured by Yantai Guguang Brazing Material, Co., Ltd.

Comparative Example 6

This comparative example provided a L209 pure tin plated brazing material manufactured by Hangzhou Huaguang Advanced Welding Materials Co., Ltd.

Experimental Example 1

The induction brazing of 45# steel was conducted with the copper-phosphorus-zinc-tin brazing sheets provided in the above examples and the brazing sheets and brazing materials provided in the comparative examples. After brazing, the mechanical properties of the brazing joints were tested using a universal tensile tester according to the method of GB/T11364. The test results are shown in Table 1 below.

TABLE 1

Test results of mechanical properties of the groups of brazing joints

| Group | Average tensile strength (MPa) | Average impact toughness (J/cm$^2$) |
|---|---|---|
| Example 1 | 190.5 | 20 |
| Example 2 | 194.6 | 19.5 |
| Example 3 | 198 | 24 |
| Example 4 | 202 | 23.5 |
| Example 5 | 195 | 22 |
| Example 6 | 208 | 20.5 |
| Example 7 | 206.5 | 20 |
| Comparative Example 1 | 167.1 | 15.5 |
| Comparative Example 2 | 155.8 | 8.4 |

TABLE 1-continued

Test results of mechanical properties of the groups of brazing joints

| Group | Average tensile strength (MPa) | Average impact toughness (J/cm²) |
| --- | --- | --- |
| Comparative Example 3 | 175.6 | 19.8 |
| Comparative Example 4 | 156 | 9.5 |
| Comparative Example 5 | 166 | 16.5 |
| Comparative Example 6 | 160 | 14.2 |

As can be seen from the test results of the mechanical properties in Table 1, the average tensile strengths of the brazing steel joints obtained with the copper-phosphorus-zinc-tin brazing sheets provided by the examples of the present disclosure were all higher than 190 MPa, while the average tensile strength of the brazing steel joint obtained with the traditional L209 copper-phosphorus brazing material of Comparative Example 4 was 156 MPa, the average tensile strength of the brazing steel joint obtained with the L209 low-melting-point silver alloy plated brazing material of Comparative Example 5 was 166 MPa, and the average tensile strength of the brazing steel joint obtained with the L209 tin-plated brazing material of Comparative Example 6 was 160 MPa. Moreover, the impact toughness values of the brazing steel joints obtained with the copper-phosphorus-zinc-tin brazing sheets provided by the examples of the present disclosure were also significantly higher than those of the comparative examples. It can be seen that the brazing steel joints obtained with the copper-phosphorus-zinc-tin brazing sheets provided by the present disclosure had higher tensile strength and better toughness.

In addition, the metallographic structures of the interfaces of the brazing joints obtained in Example 3, Comparative Example 4, Comparative Example 5, and Comparative Example 6 were inspected respectively, and the results are shown in FIG. 2, FIG. 3, FIG. 4, and FIG. 5, respectively. It can be seen that a thick interfacial brittle layer was present at the brazing seam interface of each of the brazing steels in Comparative Example 4, Comparative Example 5, and Comparative Example 6, while the brittle layer was hardly observed in the brazing seam interface of the brazing steel in Example 3.

Although the present disclosure has been illustrated and described with specific examples, it should be appreciated that the above examples are only used to illustrate, but not limit, the technical solutions of the present disclosure. Those of ordinary skill in the art should understand that, the technical solutions described in the foregoing examples may be modified, or some or all of the technical features thereof may be equivalently replaced without departing from the spirit and scope of the present disclosure. These modifications or replacements do not render the corresponding technical solutions essentially departing from the scope of the technical solutions of the examples of the present disclosure. Therefore, it is intended that all such replacements and modifications that fall within the scope of the present disclosure are encompassed in the appended claims.

The invention claimed is:

1. A copper-phosphorus-zinc-tin brazing sheet, comprising a copper core layer, CuP alloy layers respectively arranged on two sides of the copper core layer, and at least two SnZn alloy layers respectively arranged on other sides of the two CuP alloy layers away from the copper core layer.

2. The copper-phosphorus-zinc-tin brazing sheet according to claim 1, wherein the CuP alloy comprises at least one of Cu8P alloy, Cu9P alloy, Cu10P alloy, Cu11P alloy, and Cu12P alloy.

3. The copper-phosphorus-zinc-tin brazing sheet according to claim 1, wherein a mass ratio of Cu, P, and the SnZn alloy in the copper-phosphorus-zinc-tin brazing sheet is 75-90:3-10:1-8.

4. The copper-phosphorus-zinc-tin brazing sheet according to claim 1, wherein the copper-phosphorus-zinc-tin brazing sheet has a thickness of 0.1-3 mm.

5. A preparation method of the copper-phosphorus-zinc-tin brazing sheet according to claim 1, comprising:
making a copper core pass through a melted CuP alloy liquid to form a CuP alloy layer on the copper core via an alloying reaction, and then pass through a solid SnZn alloy powder to alloy the SnZn alloy powder on an outer side of the CuP alloy layer with the use of waste heat from the previous alloying reaction to obtain the copper-phosphorus-zinc-tin brazing sheet.

6. The preparation method of the copper-phosphorus-zinc-tin brazing sheet according to claim 5, wherein a temperature of the melted CuP alloy liquid is 800-850° C.

7. The preparation method of the copper-phosphorus-zinc-tin brazing sheet according to claim 5, wherein the solid SnZn alloy powder has a particle size of 120-200 meshes.

8. The preparation method of the copper-phosphorus-zinc-tin brazing sheet according to claim 5, wherein a passing speed is 20-30 mm/s.

9. The preparation method of the copper-phosphorus-zinc-tin brazing sheet according to claim 5, wherein a spreading length of the solid SnZn alloy powder is 150-300 mm.

10. A method for using the copper-phosphorus-zinc-tin brazing sheet according to claim 1 comprising using the copper-phosphorus-zinc-tin brazing sheet in welding steel and nickel-based alloys.

11. The copper-phosphorus-zinc-tin brazing sheet according to claim 2, wherein the SnZn alloy comprises at least one of Sn90Zn alloy, Sn91Zn alloy, and Sn92Zn alloy.

12. The copper-phosphorus-zinc-tin brazing sheet according to claim 3, wherein the mass ratio of Cu, P, and the SnZn alloy in the copper-phosphorus-zinc-tin brazing sheet is 80-89:5-9:2-6.

13. The copper-phosphorus-zinc-tin brazing sheet according to claim 4, wherein the copper-phosphorus-zinc-tin brazing sheet has a thickness of 0.4-2 mm.

14. The copper-phosphorus-zinc-tin brazing sheet according to claim 4, wherein the copper core layer has a thickness of 0.1-0.3 mm.

15. The copper-phosphorus-zinc-tin brazing sheet according to claim 4, wherein each of the CuP alloy layers has a thickness of 0.18-0.3 mm.

16. The copper-phosphorus-zinc-tin brazing sheet according to claim 4, wherein each of the SnZn alloy layers has a thickness of 0.015-0.025 mm.

17. The preparation method of the copper-phosphorus-zinc-tin brazing sheet according to claim 8, wherein the passing speed is 22-28 mm/s.

18. The preparation method of the copper-phosphorus-zinc-tin brazing sheet according to claim 9, wherein the spreading length of the solid SnZn alloy powder is 180-260 mm.

* * * * *